United States Patent [19]

Wasser

[11] Patent Number: 5,759,249
[45] Date of Patent: Jun. 2, 1998

[54] SIZING EMULSION

[75] Inventor: Richard Barkman Wasser, Norwalk, Conn.

[73] Assignee: Cytec Technology Corp., Wilmington, Del.

[21] Appl. No.: 795,179

[22] Filed: Feb. 4, 1997

[51] Int. Cl.$^6$ .................. D21H 17/16; D21H 17/29; D21H 21/16; C09D 103/04

[52] U.S. Cl. .................. 106/209.1; 106/287.2; 162/175; 162/158

[58] Field of Search .................. 106/209.1, 287.2; 102/175, 158

[56] References Cited

U.S. PATENT DOCUMENTS

| | | |
|---|---|---|
| Re. 29,960 | 4/1979 | Mazzarella et al. . |
| 3,102,064 | 8/1963 | Wurzburg et al. . |
| 4,040,900 | 8/1977 | Mazzarella et al. . |
| 4,207,142 | 6/1980 | Shepard .................. 106/209.1 |
| 4,529,447 | 7/1985 | Okada et al. . |
| 4,544,414 | 10/1985 | Kawatani et al. . |
| 4,606,773 | 8/1986 | Novak . |
| 4,657,946 | 4/1987 | Rende et al. . |
| 4,687,519 | 8/1987 | Trzasko et al. . |
| 4,711,671 | 12/1987 | Mazzarella et al. . |
| 5,176,748 | 1/1993 | Nikoloff et al. . |
| 5,658,378 | 8/1997 | Tsai et al. .................. 106/209.1 |

FOREIGN PATENT DOCUMENTS

| | | | |
|---|---|---|---|
| 1069410 | 1/1980 | Canada . | |
| 58-087398 | 5/1983 | Japan . | |
| 58-197396 | 11/1983 | Japan . | |
| 61-028098 | 2/1986 | Japan .................. | 106/287.2 |

OTHER PUBLICATIONS

Gordon C. I. Chen and Thomas W. Woodward Optimizing the emulsification and sizing of alkenyl succinic anhydride Tappi Journal (Aug. 1986,) pp. 95–97.

C. E. Farley and R. B. Wasserman Sizing With Alkenyl Succinic Anhydride The Sizing of Paper Second Edition Edited by W.F. Reynolds Tappi Press, Atlanta, Georgia (1989,) pp. 51–62.

J. C. Roberts Neutral and alkaline sizing Paper Chemistry Edited by J.C. Roberts Chapman and Hall, NY. (1991), pp. 114–131.

*Primary Examiner*—David Brunsman
*Attorney, Agent, or Firm*—Joseph J. Mallon

[57] ABSTRACT

Sizing emulsions comprised of (a) hydrophobic cellulose-reactive sizing agents and (b) amines, amine salts and/or quaternary amines are disclosed, as well as low shear and high shear processes for making said emulsions and methods of using said emulsions for sizing paper.

25 Claims, No Drawings

SIZING EMULSION

BACKGROUND OF THE INVENTION

This invention relates to paper sizing compositions, processes for preparing sizing compositions, and to methods of sizing paper therewith. More particularly, this invention concerns compositions that are comprised of alkenyl succinic anhydride (ASA) size and amine compounds that may be used to form sizing emulsions, processes for forming said sizing emulsions, as well as methods for using said sizing emulsions in the sizing of paper.

Sizing emulsions are widely used in papermaking to introduce sizing agents to the surface and interior of paper. As used herein, "paper" is a general term that includes sheet-like masses and molded products made from fibrous cellulosic materials which may be derived from both natural and synthetic sources. In many cases it is desirable for the sizing agent to be added at the wet end of the papermaking process so that the sizing agent becomes well distributed throughout the paper product. Since the sizing agent itself e.g. ASA is often water-insoluble, the sizing agent is frequently emulsified in water to form a sizing emulsion that is then added to the paper stock during production.

Sizing agents tend to be reactive substances that are capable of forming chemical bonds to the surface of paper, and may exhibit instability when allowed to contact water for extended periods of time. Therefore, particularly with more reactive sizing agents such as ASA, it has become common practice in the industry for the sizing emulsion to be prepared at the papermaking site and used immediately thereafter in order to minimize chemical reaction between the water and the size. Emulsifying agents e.g. starches, surfactants, synthetic polymers, cationic polymers, etc. are generally used in the preparation of the emulsions.

Commercially, those skilled in the art recognize that the equipment used to prepare the sizing emulsions may be either low shear or high shear. Historically, it was difficult to prepare sizing emulsions at low shear, so high shear techniques were used which tended to require relatively complex, expensive and heavy equipment capable of exerting high homogenizing shear and/or pressures, together with rigid procedures regarding emulsifying proportions and temperatures, etc. for producing a satisfactory stable emulsion of the particular size. Useful low shear methods were developed later and are disclosed in U.S. Pat. Nos. 4,040,900; 4,544,414; 4,687,519; and 4,711,671; as well as Canadian Patent No. 1,069,410, where the use of lower trialkyl amines as emulsifying agents is disclosed. Also, the use of lauryltrimethylammonium chloride and triethylamine in sizing are disclosed in JP 58087398 and JP 58197396, respectively. However, there remains a need for sizing compositions which may be emulsified with either low shear or high shear, stable sizing emulsions that may be prepared by low shear or high shear processes, low shear and high shear processes for preparing stable sizing emulsions, and improved papermaking processes which utilize these compositions and processes.

SUMMARY OF THE INVENTION

It has now been found that the presence of certain amines, amine salts and quaternary amine salts greatly facilitates the formation of sizing emulsions, allowing them to be prepared under either low shear or high shear conditions. Surprisingly, it has also been found that pH and inorganic salt level and type may also influence the characteristics of sizing emulsions, particularly ASA sizing emulsions.

Therefore, in accordance with the instant invention, there are provided compositions comprised of, or consisting essentially of, (a) alkenyl succinic anhydride, and (b) about 3% to about 20%, by weight based on said alkenyl succinic anhydride, of an amine selected from the group consisting of trialkyl amine of the formula (I), dimethyl sulfate quaternary salt of trialkyl amine of the formula (I), benzyl chloride quaternary salt of trialkyl amine of the formula (I), and diethyl sulfate quaternary salt of trialkyl amine of the formula (I).

wherein $R_1$ is methyl or ethyl, $R_2$ is methyl or ethyl, and $R_3$ is alkyl having 14 to 24 carbon atoms, and wherein said compositions contain about 0.1% water or less. Sizing emulsions may be prepared from these compositions at either high or low shear, preferably under the conditions described herein.

In another embodiment of the instant invention, there are provided compositions comprised of (a) alkenyl succinic anhydride (b) about 3% to about 20%, by weight based on said alkenyl succinic anhydride, of an amine selected from the group consisting of trialkyl amine of the formula (I), dimethyl sulfate quaternary salt of trialkyl amine of the formula (I), benzyl chloride quaternary salt of trialkyl amine of the formula (I), and diethyl sulfate quaternary salt of trialkyl amine of the formula (I), wherein $R_1$ is methyl or ethyl, $R_2$ is methyl or ethyl, and $R_3$ is alkyl having 14 to 24 carbon atoms, (c) water, and (d) an inorganic salt, wherein said alkenyl succinic anhydride is dispersed in said water to form an emulsion, wherein said inorganic salt is present in an amount effective to reduce the droplet size of said emulsion, and wherein said emulsion has a pH value effective to provide an emulsion average droplet size of about 3 microns or less, preferably, a pH of about 4.5 or lower. Preferably, these compositions comprise sizing emulsions that may be prepared at either high or low shear, preferably under the conditions described herein.

In yet another embodiment of the instant invention, there are provided processes comprising mixing (a) alkenyl succinic anhydride(b) about 3% to about 20%, by weight based on said alkenyl succinic anhydride, of an amine selected from the group consisting of trialkyl amine of the formula (I), dimethyl sulfate quaternary salt of trialkyl amine of the formula (I), benzyl chloride quaternary salt of trialkyl amine of the formula (I), and diethyl sulfate quaternary salt of trialkyl amine of the formula (I), wherein $R_1$ is methyl or ethyl, $R_2$ is methyl or ethyl, and $R_3$ is alkyl having 14 to 24 carbon atoms, (c) water, and (d) an inorganic salt, to form an emulsion, wherein said inorganic salt is present in an amount effective to reduce the droplet size of said emulsion, and wherein said emulsion has a pH value effective to provide an emulsion average droplet size of about 3 microns or less, preferably a pH value of about 4.5 or lower. Components (a) and (b) may be premixed or added separately, preferably premixed.

In a still further embodiment of the instant invention, there are provided processes comprising mixing (a) a composition comprised of (i) alkenyl succinic anhydride, and (ii) about 3% to about 20%, by weight based on said alkenyl succinic anhydride, of an amine selected from the group consisting of trialkyl amine of the formula (I), dimethyl sulfate quaternary salt of trialkyl amine of the formula (I), benzyl chloride quaternary salt of trialkyl amine of the formula (I), and diethyl sulfate quaternary salt of trialkyl amine of the formula (I), wherein $R_1$ is methyl or ethyl, $R_2$ is methyl or ethyl, and $R_3$ is alkyl having 14 to 24 carbon atoms; (b) water; and (c) an inorganic salt to form an emulsion, wherein said inorganic salt is present in an amount effective to reduce the droplet size of said emulsion, and wherein said emulsion has a pH value effective to provide an emulsion average droplet size of about 3 microns or less, preferably a pH value of about 4.5 or lower. Said composition may be prepared at low or high shear, preferably low shear.

In an even still further embodiment of the instant invention, there are provided methods comprising (a) providing paper stock; (b) providing a composition comprised of (i) alkenyl succinic anhydride, (ii) about 3% to about 20%, by weight based on said alkenyl succinic anhydride, of an amine selected from the group consisting of trialkyl amine of the formula (I), dimethyl sulfate quaternary salt of trialkyl amine of the formula (I), benzyl chloride quaternary salt of trialkyl amine of the formula (I), and diethyl sulfate quaternary salt of trialkyl amine of the formula (I), wherein $R_1$ is methyl or ethyl, $R_2$ is methyl or ethyl, and $R_3$ is alkyl having 14 to 24 carbon atoms, (iii) water, and (iv) an inorganic salt, wherein said alkenyl succinic anhydride is dispersed in said water to form an emulsion, wherein said inorganic salt is present in an amount effective to reduce the droplet size of said emulsion, and wherein said emulsion has a pH value effective to provide an emulsion average droplet size of about 3 microns or less, preferably a pH value of about 4.5 or lower; (c) forming a web from said paper stock; and (d) mixing said emulsion with said paper stock or applying said emulsion to said web, in an amount effective to size paper that is formed from said web. Said composition may be prepared at low or high shear, preferably low shear.

DETAILED DESCRIPTION OF THE PREFERRED EMBODIMENTS

Sizing agents useful in the instant invention include substituted cyclic dicarboxylic acid anhydrides. Preferably, sizing agents are of the formula (II):

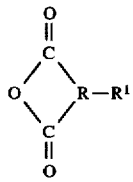
(II)

wherein R is a dimethylene or trimethylene radical and wherein $R^1$ is a hydrophobic group containing more than 5 carbons. Preferably, $R^1$ is a linear or branched alkyl, alkenyl, aralkyl, or aralkenyl group. Most preferably, the sizing agents of the instant invention are alkenyl succinic anhydrides (ASA). Specific examples of sizing agents useful in the instant invention are iso-octadecenyl succinic anhydride, n-hexadecenyl succinic anhydride, dodecenyl succinic anhydride, decenyl succinic anhydride, dodecyl succinic anhydride, octenyl succinic anhydride, triisobutenyl succinic anhydride, 1-octyl-2-decenyl succinic anhydride, 1-hexyl-2-decenyl succinic anhydride, etc. and mixtures thereof. A particularly preferred ASA is Accosize 17®, commercially available from Cytec Industries, Inc. Rosin and alkyl ketene dimer (AKD) sizes may also be useful in the instant invention. Other examples of sizing agents useful in the instant invention are those disclosed in U.S. Pat. Nos. Re. 29,960; 4,687,519; 4,040,900; 3,102,064; 3,821,069; 3,968,005; all of which are hereby incorporated herein by reference.

In many cases, sizing agents are conveniently supplied to the user in admixture with emulsifying agents e.g. surfactants. The user typically emulsifies the sizing agent in water to form a sizing emulsion comprised of droplets of a discontinuous phase of the sizing agent and a continuous aqueous phase. In most cases, the sizing emulsion is formed by high shear mixing, using e.g. a homogenizer, high shear turbine pump, etc. Since the sizing agent is often hydrolytically unstable, the sizing emulsion is generally used soon after preparation, so long-term emulsion stability may not be needed. Oftentimes, however, it is desirable to conduct the emulsification in a solution of a cationic polymer e.g. cationic starch, or to add the cationic polymer after emulsification, which may increase the stability of the sizing emulsion, as well as providing other well-known benefits to the paper-making process.

It has now been discovered that certain amines may be used as emulsifying agents, and that the use of these amines permits the formation of the sizing emulsion at either low shear or high shear, advantageously affording much greater flexibility to the user, as well as allowing for reduced cost and complexity in the papermaking process. Amines useful in the instant invention include amines of the formula (I),

(I)

where $R_1$ is $C_1$ to $C_5$ alkyl, preferably methyl or ethyl, $R_2$ is $C_1$ to $C_5$ alkyl, preferably methyl or ethyl, and $R_3$ is benzyl or alkyl having 14 to 24 carbon atoms, preferably 16 to 20 carbon atoms, most preferably 16 to 18 carbon atoms. $R_1$, $R_2$ and $R_3$ may be saturated or unsaturated. The use of mixtures of amines may be advantageous, and amines such as soya dimethyl, tallow dimethyl, hydrogenated tallow dimethyl, coco dimethyl, oleyl dimethyl, stearyl dimethyl, etc. are preferred. Of course, depending on the pH of the sizing emulsion, the actual amine species present in a particular composition may be the acid salt of the amine. Therefore, for the purposes of the instant invention, the term "amine" may be read broadly to include acid salts of amine, e.g. salts formed by reaction of amine with common organic and inorganic acids such as hydrochloric acid, sulfuric acid, acetic acid, etc., as well as amine hydrates and quaternary salts of amines. For instance, one preferred amine is the monohydrate of the benzyl chloride salt of stearyl dimethyl amine. Even more preferably, the amine is quaternized with known quaternizing agents such as methyl chloride, dimethyl sulfate, diethyl sulfate and benzyl chloride. Surprisingly, amines quaternized with methyl chloride tend to be less effective when used to form sizing emulsions with ASA at low shear than amines quaternized with dimethyl sulfate or diethyl sulfate. Quaternized amines tend to be more sensitive to the particular emulsion conditions. For instance, the ethyl sulfate quaternary salt of soya dimethyl amine and the methyl sulfate quaternary salt of soya dimethyl amine give preferred sizing emulsions at low shear.

Amounts of amine (which term includes amine salts, quaternaries and hydrates) useful in the instant invention typically depend on the sizing agent content of the sizing emulsion, in most cases ranging from about 3% to about 20%, by weight based on sizing agent. Generally, the amount of amine used is that which is effective to produce a sizing emulsion when mixed with the sizing agent and water. Preferably, the amount of amine is about 4% or greater, preferably about 5% or greater, by weight based on sizing agent. Although amounts of amine greater than about 20% could be used, excessive amounts of amine offer little additional benefit and may be wasteful or dilutive. Accordingly, the amount of amine is generally about 20% or less, preferably about 15% or less, most preferably about 10% or less, by weight based on sizing agent. Preferably, the amine and sizing agent are miscible e.g. form a single phase solution when mixed, so that the user may be provided with a convenient admixture comprised of the amine and the sizing agent, preferably ASA.

Sizing emulsions useful in commercial practice generally have an average emulsion droplet or particle size of about 5 microns or less, preferably about 3 microns or less, most preferably 2 microns or less. Droplet size may be conveniently measured by any number of well-known particle size measurement techniques e.g. microscopy, classical and quasi-elastic light scattering, sedimentation, disc centrifugation, electrozone sensing, sedimentation field flow fractionation, and chromatographic methods. Conveniently, droplet sizes may be estimated by a simple turbidity technique such as the Klett technique, which has been calibrated by a centrifugation method using an instrument such as a Horiba CAPA 700 particle size analyzer, or by a light scattering method using an instrument such as a Horiba LA-700 particle size analyzer, as described in the Examples. For instance, a Klett value of about 250 corresponds to a median volume average droplet or particle size of about 0.6 to 0.8 microns, a Klett value of about 200 corresponds to a median volume average droplet size of about 0.9 to 1.3 microns, and a Klett value of about 160 corresponds to a median volume average droplet size of about 1.5 to 1.9 microns. Although in some instances a sizing emulsion having a Klett value below about 100 may be useful, sizing emulsions generally have Klett values of about 100 or greater, preferably about 150 or greater, more preferably about 180 or greater, most preferably about 200 or greater.

The droplet size of the instant sizing emulsions may be controlled by adjusting the pH. For instance, when tertiary amines are used as the emulsifying agent, small droplet size emulsions may be formed at low shear when the water is acidic. With tertiary amines, it is preferable to dissolve the amine in the sizing agent before making the sizing emulsion, although separate addition of the amine to the acidified water may be acceptable in some cases. When amine salts or quaternized amines are employed, they are frequently present in quantities that are effective to provide an emulsion-stabilizing pH, so that separate addition of acid may not be necessary. Therefore, acid addition may or may not be necessary, depending on the droplet size desired, the pre-existing pH of the water used to make the sizing emulsion, the form of the amine (free amine, salt, or quaternary), the amount of amine, the presence or absence of other typical papermaking additives which may influence pH, etc. Acids useful for pH adjustment include all common organic acids such as acetic acid, citric acid, lactic acid, etc., as well as inorganic acids, preferably inorganic acids such as hydrochloric acid, sulfuric acid, phosphoric acid, etc. Generally, the pH during emulsification is effective to give emulsions having droplet sizes within the ranges discussed above. Preferably, the pH is about 6.0 or less, more preferably 4.5 or less, even more preferably 4.0 or less, most preferably 3.5 or less.

The droplet size of the instant sizing emulsions may also be controlled by adjusting the level and type of inorganic salt. Any inorganic salt may be utilized, preferably chloride and phosphate salts e.g. sodium chloride, potassium chloride, magnesium chloride, calcium chloride, $Na_3PO_4$, $Na_2HPO_4$, $NaH_2PO_4$; most preferably sulfate salts e.g. sodium sulfate, aluminum sulfate, ammonium sulfate, and hydrates thereof. Generally, sulfate salts are more effective than the other salts on a weight basis, depending on the amount used. For instance, sulfate levels of about 10 to about 200 parts per million (ppm), preferably 15 to 100 ppm, most preferably about 25 to about 50 ppm, are highly effective for reducing emulsion droplet size. However, at higher levels, sulfate salts are often no more effective than the other salts. Chloride and phosphate salts are generally not as effective at low levels e.g. about 10 to about 50 ppm, but generally increase in effectiveness at higher levels e.g. about 50 to 1000 ppm or even greater. Generally, the amount of salt employed is that which is effective to reduce the droplet size of the emulsion, e.g. it is preferable to use water in making the sizing emulsion that contains an amount of salt which results in a smaller droplet size emulsion than when water is used that does not contain that amount of salt. Practically, although desirable droplet sizes may be achieved at very high salt levels, the incremental gain may only be minimal when excessive amounts of salt are used, and may even be detrimental by leading to other problems e.g. corrosion, so the use of wasteful or disadvantageous levels of salt is to be avoided.

Compositions comprised of the sizing agent and the amine may be supplied to the user, or, less preferably, each component may be supplied separately, and mixed with water of a pH and/or salt level effective to produce an emulsion of the desired droplet size when shear is applied to the mixture. Preferably, compositions comprised of the sizing agent and the amine are supplied to the user in a substantially anhydrous condition so that detrimental hydrolysis of the sizing agent is avoided; most preferably, these substantially anhydrous compositions contain 0.1% water or less, preferably 0.05% or less, by weight based on total weight. Emulsification e.g. mixing of the compositions of the instant invention with water to form sizing emulsions is preferably performed using cold water to reduce hydrolysis of the sizing agent e.g. ASA and to reduce the emulsion droplet size. Generally, the emulsification temperature is effective to achieve the droplet sizes discussed above. Preferably, the water used for emulsification has a temperature of about 40° C. or less, more preferably about 30° C. or less, even more preferably about 20° C. or less, most preferably about 13° C. or less.

It is a feature of the instant invention that compositions comprised of ASA and amine are generally stable, in that there is typically little detrimental or significant change in the droplet size of emulsions formed from these compositions as a function of the storage time of the composition, even where the storage times range from one day to 99 days.

Sizing emulsions may be prepared using either high shear or low shear conditions, preferably low shear. The distinction between high shear and low shear conditions is well-known in the art, as evidenced by the disclosures of U.S. Pat. Nos. 4,711,671; 4,687,519; 4,544,414; 4,040,900; Canadian Patent No. 1,069,410; C. E. Farley and R. B. Wasser, "Sizing with Alkenyl Succinic Anhydride," in *The Sizing of Paper* 2nd Edition, ed. W. Reynolds, Tappi Press, p.54–55; G. Chen and T. Woodward, "Optimizing the emulsification and sizing of alkenyl succinic anhydride," Tappi Journal, August 1986 pp. 95–97; and J. C. Roberts, "Neutral and alkaline sizing," in *Paper Chemistry*, Blackie & Son, 1991, p. 125, all of which are hereby incorporated herein by reference. Compositions and processes which allow sizing emulsions to be prepared at low shear; i.e. without the necessity of high shear turbine pumps, but merely by stirring, passing through a mixing valve, or by the usual agitation present in a paper stock preparation system, may advantageously increase the operational flexibility of the papermaking process with concomitant increases in production efficiency.

The stability of the instant sizing emulsions may be improved by mixing in amounts of cationic polymer that are effective to provide improved physical stability to the emulsion, as compared to sizing emulsions that do not contain that amount of cationic polymer. Although instability, often evidenced by bulk separation of the sizing agent and water, may not be a problem when the sizing emulsion is used immediately after being formed, in many cases additional emulsion stability is desired or necessary. The addition of cationic polymers before, during or after the formation of the emulsion has been found to confer an added degree of stability to the resulting sizing emulsion. Generally, any cationic polymer known to be useful in papermaking may be used, preferably cationic polyacrylamides, e.g. copolymers of acrylamide with cationic monomers such as the salts and quaternaries of dialkylaminoalkly(alk)acrylate, dialkylaminoalkyl(alk) acrylamide, etc.; polymers and copolymers of diallyidialkylammonium halides; polyamines; vinylamine/vinyl alcohol copolymers; polyethyleneimines; polyamidoamines; cationic condensation polymers such as amine-epichlorohydrin polymers; naturally occurring cationic polymers such as cationic guar gum, etc. and the like. Most preferably, the cationic polymer is a cationic starch. If smaller droplet size emulsions are desired, the cationic polymer is preferably added after the emulsion has been formed. Cationic polymer concentration may range from 0.01% to about 5%, preferably 0.5% to 3%, by weight based on total emulsion weight. Although the conditions for adding the cationic polymer may vary for AKD and rosin sizing agents, low temperature and low pH process conditions are preferred for hydrolytically unstable sizing agents such as ASA.

The sizing emulsions of the instant invention may be advantageously employed e.g. in a papermaking process by adding them to a cellulosic composition e.g. a paper stock, paper web, etc., in the usual manner and in amounts effective to size paper that is formed from the cellulosic compositions in the normal course of the papermaking process. Amounts of size e.g. ASA ranging from about 0.1 to about 20 pounds, preferably about 0.5 to about 10 pounds, per dry ton of paper may be beneficially used, depending on the type of paper being produced. The sizing emulsion is preferably metered to the paper machine, and is preferably added to thin stock at any point where good mixing is available e.g. cleaner accepts, screen inlet, etc. The sizing emulsion may also be applied directly to a paper web formed from the paper stock, preferably by spraying or by size pressing e.g. applying at the size press. Sizing effectiveness may be measured by any one of a number of known techniques, including ink penetration tests and contact angle measurements, see R. Kumler, "Testing Paper and Board for Sizing," in *The Sizing of Paper 2nd Edition,* e.d. W. Reynolds, Tappi Press, 1989, pp. 103–132. For instance, in the sizing test used in the Examples herein, fresh pH 7 buffered green dye is placed on one side of the paper, and the time for the reflectance on the side opposite to that exposed to the liquid to fall to 80% of its original level is measured.

The following Examples illustrate the instant invention, but do not limit its scope. In the following Examples, droplet or particle size was estimated by the Klett turbidity technique as follows: The sizing emulsion was diluted with water to 0.01% ASA and a portion was added to a 20 by 40 mm cell for a Klett-Summerson model 900-3 calorimeter equipped with a blue No. 42 filter. The cell was placed in the instrument so the path length was in the long direction. The amount of transmitted light was measured in units of absorbance which is the negative log of the transmittance. As the droplet size decreases the turbidity increases, reducing the light transmitted and increasing the absorbance. This is demonstrated in Table 1, in which a more-or-less typical correlation between the volume median droplet diameter as measured using a Horiba LA 700 particle size analyzer and by the Klett turbidity technique is shown for a 0.01% ASA sizing emulsion.

In the Examples below, amines, ASA, and other reagents were obtained from commercial sources except where indicated. Tap water contained about 26 ppm of sulfate and about 28 ppm of chloride. The ASA used was a mixture, comprised predominately of hexadecenyl succinic anhydride and octadecenyl succinic anhydride.

TABLE 1

| Klett-Summerson Absorbance Value (0.01% ASA) | Horiba LA 700 Median Volume Average Droplet Diameter, microns |
| --- | --- |
| 120 | 3.04 |
| 168 | 1.88 |
| 180 | 1.59 |
| 202 | 1.22 |
| 14 | 1.03 |
| 232 | 0.81 |

EXAMPLES 1–12

Low shear emulsification procedure: Five percent by weight of the amine was dissolved in alkenyl succinic anhydride (ASA). Into a 100 milliliter (mL) tall glass beaker containing a 1.5 inch magnetic stir bar was weighed 49.5 grams (g) of tap water that had been preadjusted to pH 3 using dilute hydrochloric acid. While magnetic stirring at low shear (vortex reaching to the stirring bar), about 0.5 g of the ASA containing the 5% amine was added by dropper. The exact amount was determined by weighing the dropper before and after addition. Stirring was continued for about 10 seconds, then stopped.

The droplet size of the resulting emulsion was determined immediately thereafter by the Klett turbidity technique. Results shown in Table 2 show the effectiveness of various amines and that tertiary amines in particular give ASA emulsions at low shear.

TABLE 2

| Example No. | Amine | Klett Turbidity |
| --- | --- | --- |
| 1 | Octadecyl dimethyl amine | 248 |
| 2 | Hexadecyl dimethyl amine | 238 |
| 3 | Tallow dimethyl amine | 244 |
| 4 | Hydrogenated tallow dimethyl amine | 249 |
| 5 | Soya dimethyl amine | 232 |
| 6 | Oleyl dimethyl amine | 212 |
| 7 | N-Ethyl, N-methyl octadecyl amine | 174 |
| 8 | Dodecyl dimethyl amine | 24 |
| 9C | Triethyl amine | NE |
| 10C | Dihydrogenated tallow amine (secondary amine) | NE |
| 11C | N-Octadecyl amine (primary amine) | NE |
| 12C | N-Tallow ethylene diamine | NE |

NE: No emulsion formed
C: Comparative

EXAMPLES 13–15

The head of a Ross Model 100L laboratory homogenizer, having a 1⅜-inch diameter blade and a fine screen stator and designed for high shear preparation of dispersions and emulsions, was immersed in 450 g of tap water that had been adjusted to pH 3 with dilute hydrochloric acid. With the homogenizer running, 5 g of ASA containing 5% by weight of octadecyl dimethyl amine was added. The Klett values of the resulting emulsions are shown in Table 3 for various (approximate) homogenizer speed settings and mixing times. These Examples demonstrate the effectiveness of octadecyl dimethyl amine in forming ASA sizing emulsions under high shear conditions.

TABLE 3

| Example No. | Speed Setting, rpm | Mixing Time, seconds | Klett Turbidity |
|---|---|---|---|
| 13 | 4,000 | 5 | 250 |
| 14 | 7,000 | 15 | 256 |
| 15 | 10,000 | 60 | 256 |

EXAMPLES 16–27

Handsheets were prepared with three different ASA emulsions to demonstrate that emulsions formed with alkyl tertiary amines are effective for sizing paper. The first sizing emulsion, designated emulsion A, was a control emulsion made by a conventional high shear emulsion process as described in Example 15, except that an anionic emulsifier was used in place of the amine and the emulsion was prepared in a solution of 3% cationic potato starch. The Klett turbidity of this emulsion was 179.

Sizing emulsions B and C are embodiments of the instant invention and were made by the low shear procedure described in Examples 1–12; the ASA in both cases contained 5% of dimethyl soya amine. Emulsion B had a Klett value of 193 and emulsion C had a Klett value of 174. Both emulsions were post-diluted with cationic potato starch in an amount equal to that used in emulsion A.

The paper stock consisted of 50% softwood/50% hardwood bleached kraft refined to 500 Canadian standard freeness with 15% added precipitated calcium carbonate filler based on the fiber. The pH was adjusted to 7.5 and the consistency to 0.6%. Batches containing 10 g of dry fiber were treated while stirring with a given amount of ASA sizing emulsion, followed by a solution of anionic retention aid equal to one pound/ton dosage. Three 2.8 g handsheets, each approximately 8 inches square, were formed from each batch using a Noble and Wood handsheet former. The formed sheets were pressed between felts in the nip of press rolls, then drum dried on a rotary drier for one minute at 240° F. The sheets were conditioned at 73° F. and 50% relative humidity before measuring the sizing using an ink penetration test similar in design to that described in Tappi Standard 530 pm-83 using 1.25% aqueous naphthol green B dye buffered to pH 7 as the test fluid. Four measurements were made on each of the three sheets and the test results averaged. The results shown in Table 4 demonstrate the amounts of ASA, emulsified at low shear with alkyl tertiary amines, that are effective for sizing paper.

TABLE 4

| Example No. | Sizing Emulsion | ASA Dosage, lb/ton | Ink Penetration, seconds |
|---|---|---|---|
| 16C | A | 2 | 50 |
| 17 | B | 2 | 38 |

TABLE 4-continued

| Example No. | Sizing Emulsion | ASA Dosage, lb/ton | Ink Penetration, seconds |
|---|---|---|---|
| 18 | C | 2 | 40 |
| 19C | A | 2.5 | 212 |
| 20 | B | 2.5 | 203 |
| 21 | C | 2.5 | 153 |
| 22C | A | 3 | 368 |
| 23 | B | 3 | 322 |
| 24 | C | 3 | 293 |
| 25C | A | 3.5 | 447 |
| 26 | B | 3.5 | 520 |
| 27 | C | 3.5 | 410 |

EXAMPLES 28–31

Dimethyl tallow amine was dissolved in ASA at levels of 2.5, 5, 7.5 and 10% by weight to form ASA/amine mixtures. Sizing emulsions were prepared by adding 0.18 g of each mixture to 200 g of pH 3 tap water in a 300 mL beaker while magnetic stirring with the vortex to the bottom of the beaker. Stirring was continued for 30 seconds, then the resulting emulsion was diluted to 0.01% ASA and the Klett turbidity measured as shown in Table 5. The results in Table 5 illustrate amounts of amine effective for forming ASA emulsions at low shear.

TABLE 5

| Example No. | % Dimethyl soya amine in ASA | Klett Turbidity |
|---|---|---|
| 28 | 2.5 | 100 |
| 29 | 5 | 226 |
| 30 | 7.5 | 250 |
| 31 | 10 | 244 |

EXAMPLES 32–36

The low shear emulsification procedure described in Examples 1–12 was used to prepare 5 ASA emulsions. The ASA used to prepare each emulsion contained 5% by weight of dimethyl hydrogenated tallow amine. The tap water used to prepare each emulsion was adjusted to different pH levels using 0.1N hydrochloric acid. The effect of the emulsification pH is shown in Table 6, which shows that pH may be used to adjust sizing emulsion droplet size.

TABLE 6

| Example No. | pH of Water | Klett Turbidity |
|---|---|---|
| 32 | 2.8 | 244 |
| 33 | 3.3 | 241 |
| 34 | 3.65 | 206 |
| 35 | 3.85 | 160 |
| 36 | 5 | 24 |

EXAMPLES 37–47

The low shear emulsification procedure of Examples 1–12 was used to prepare 10 ASA emulsions. The ASA used to prepare each emulsion contained 5% by weight of dimethyl hydrogenated tallow amine. The deionized water used to prepare each emulsion was adjusted to pH 2.8 using 0.1N hydrochloric acid. The water was also adjusted to different salt levels (given in Table 7 in units of parts per million (ppm) of sulfate ion) using sodium sulfate. The effect of sulfate concentration is shown in Table 7, which shows that salt concentration may be used to adjust sizing emulsion droplet size.

TABLE 7

| Example No. | Sulfate Ion Concentration, ppm | Klett Turbidity |
| --- | --- | --- |
| 37 | 0 | 139 |
| 38 | 2.7 | 182 |
| 39 | 5.5 | 214 |
| 40 | 8.7 | 218 |
| 41 | 14.6 | 242 |
| 43 | 20.1 | 234 |
| 44 | 27.4 | 242 |
| 45 | 45.7 | 224 |
| 46 | 75.4 | 218 |
| 47 | 105 | 190 |

EXAMPLE 48

Into a 5-gallon pail was added 7500 mL of deionized water cooled to 13° C. The sulfate ion concentration was adjusted to 50 ppm by adding 37.5 mL of a 1% sodium sulfate solution. The pH was adjusted to 3 by adding 20 mL of 0.5N hydrochloric acid. While stirring at low shear with a small propeller-type mixer, 76.8 g of ASA containing 5% by weight of dimethyl octadecyl amine was added. Mixing was continued for about 30 seconds, then stopped. The Klett turbidity of the resulting emulsion was 224. The ASA emulsion was stabilized by adding 7.5 liters of a 3% cationic potato starch solution. The Klett turbidity of the emulsion following the addition of the starch was 238. This Example demonstrates that, on this scale, low shear mixing with a small propeller-type mixer may be used to prepare a sizing emulsion, and also the effect of post-adding starch on the droplet size of the emulsion.

EXAMPLES 49–81

The low shear emulsification procedure of Examples 1–12 was used to form a number of ASA sizing emulsions having the Klett turbidity values shown in Table 8. These results demonstrate the influence of quaternary amine salt type on droplet size and also demonstrate the effectiveness of quaternary amines at low shear.

TABLE 8

| No. | Amine | Klett Turbidity |
| --- | --- | --- |
| 49 | Soya dimethyl amine, ethyl sulfate quat | 240 |
| 50 | Soya dimethyl amine, methyl sulfate quat | 220 |
| 51 | Soya dimethyl amine, methyl chloride quat | NE |
| 52 | Tallow dimethyl amine, methyl chloride quat | NE |
| 53 | Octadecyl dimethyl amine, methyl chloride quat | 56 |
| 54 | Cetyl dimethyl amine, methyl chloride quat | 60 |
| 55 | Myristyl dimethyl amine, methyl chloride quat | 15 |
| 56 | Coco dimethyl amine, methyl chloride quat | NE |
| 57C | Dodecyl dimethyl amine, benzyl chloride quat | NE |
| 58C | Lauryl dimethyl amine, benzyl chloride quat | NE |
| 59 | Cetyl dimethyl amine, benzyl chloride quat (monohydrate) | NE |
| 60 | Tetradecyl dimethyl amine, benzyl chloride quat (dihydrate) | NE |
| 61 | Stearyl dimethyl amine, benzyl chloride quat | 37 |
| 62 | Stearyl dimethyl amine, benzyl chloride quat (monohydrate) | 158 |
| 63 | Tallow dimethyl amine, benzyl chloride quat | NE |
| 64 | (Diisobutylcresoxyethoxyethyl) dimethyl amine, benzyl chloride quat | 9 |
| 65 | (Diisobutylphenoxyethoxyethyl) dimethyl amine, benzyl chloride quat | 6 |

TABLE 8-continued

| No. | Amine | Klett Turbidity |
| --- | --- | --- |
| 66 | Alkyl dimethyl amine, 3,4-dichlorobenzyl chloride quat | 42 |
| 67C | Didodecyl methyl amine, methyl chloride quat | 10 |
| 68C | Dilauryl methyl amine, methyl bromide quat | NE |
| 69C | Dicoco methyl amine, methyl chloride quat | NE |
| 70C | Disoya methyl amine, methyl chloride quat | NE |
| 71C | Dihydrogenated tallow methyl amine, methyl chloride quat | NE |
| 72C | Distearyl methyl amine, methyl chloride quat | NE |
| 73C | Tributyl amine, benzyl chloride quat | NE |
| 74C | Tetrapentyl ammonium chloride | NE |
| 75C | Tetrahexyl ammonium chloride | NE |
| 76C | Tetraheptyl ammonium chloride | NE |
| 77C | Tetraoctyl ammonium chloride | NE |
| 78C | Tetraoctadecyl ammonium chloride | NE |
| 79C | Cetyl pyridinium chloride | 15 |
| 80C | Coco imidazolinium chloride | NE |
| 81C | Stearyl imidazolinium chloride | NE |

NE: No emulsion formed, although emulsions would be expected, when the amines are of the formula (I), under other emulsion conditions e.g. different shear, pH, salt level, etc.
C: Comparative

EXAMPLES 82–93

Samples of four different alkyl dimethylamines were quaternized with either dimethyl sulfate, diethyl sulfate, or methyl chloride as shown in Table 9. Sizing emulsions were made with ASA containing 5% of each of the quaternized amines by the low shear emulsification procedure of Examples 1–12, except that deionized water adjusted to pH 3 and containing 200 ppm of sulfate ion was used. The Klett turbidity values shown in Table 9 indicate that, at low shear, dimethyl sulfate and diethyl sulfate quaternary salts of amines tend to give smaller droplet size sizing emulsions than when the methyl chloride quaternary salts of the same amines are used.

TABLE 9

| Example No. | Tertiary Amine | Quaternizing Agent | Klett Turbidity |
| --- | --- | --- | --- |
| 82 | Dimethyl soya | Diethyl sulfate | 108 |
| 83 | Dimethyl soya | Dimethyl sulfate | 127 |
| 84 | Dimethyl soya | Methyl chloride | 18 |
| 85 | Dimethyl tallow | Diethyl sulfate | 116 |
| 86 | Dimethyl tallow | Dimethyl sulfate | 136 |
| 87 | Dimethyl tallow | Methyl chloride | 13 |
| 88 | Dimethyl hexadecyl | Diethyl sulfate | 110 |
| 89 | Dimethyl hexadecyl | Dimethyl sulfate | 132 |
| 90 | Dimethyl hexadecyl | Methyl chloride | 14 |
| 91C | Dimethyl dodecyl | Diethyl sulfate | NE |
| 92C | Dimethyl dodecyl | Dimethyl sulfate | NE |
| 93C | Dimethyl dodecyl | Methyl chloride | 4 |

EXAMPLES 94–105

The head of a Ross Model 100L laboratory homogenizer, having a 1⅜-inch diameter blade and a tine screen stator and designed for high shear preparation of dispersions and emulsions, was immersed in 490 g of deionized water that had been adjusted to pH 3 with dilute hydrochloric acid. The water also contained 25 ppm of sulfate ion (as sodium sulfate) and 50 ppm of alkalinity as calcium carbonate (by addition of sodium bicarbonate). With the homogenizer running, 10 g of ASA containing 5% by weight of the diethyl sulfate quaternary of soya dimethyl amine was added. The Klett values of the resulting emulsions are shown in Table 10 for various (approximate) homogenizer speed settings and mixing times. These Examples demonstrate the effectiveness of quaternary amine in forming ASA sizing emulsions under high shear conditions.

TABLE 10

| No. | Speed Setting, rpm | Mixing Time, seconds | Klett Turbidity |
|---|---|---|---|
| 94 | 4,000 | 5 | 195 |
| 95 | 4,000 | 10 | 195 |
| 96 | 4,000 | 20 | 195 |
| 97 | 6,000 | 5 | 222 |
| 98 | 6,000 | 10 | 222 |
| 99 | 6,000 | 20 | 228 |
| 100 | 8,000 | 5 | 224 |
| 101 | 8,000 | 10 | 229 |
| 102 | 8,000 | 20 | 235 |
| 103 | 10,000 | 5 | 234 |
| 104 | 10,000 | 10 | 248 |
| 105 | 10,000 | 20 | 248 |

EXAMPLES 106–113

Handsheets were prepared with two different ASA emulsions to demonstrate that emulsions formed with quaternized amines are effective for sizing paper. The first sizing emulsion, designated emulsion A, was a control emulsion made by a conventional high shear emulsion process as described in Example 94–105 (45 seconds at 10,000 rpm), except that an anionic emulsifier was used in place of the amine and the emulsion was prepared in a solution of 3% cationic potato starch. The Klett turbidity of this emulsion was 198.

Sizing emulsion B was made by the low shear emulsification procedure described in Examples 1–12; the ASA contained 5% of the diethyl sulfate quaternary of soya dimethyl amine. Emulsion B had a Klett value of 210 and was post-diluted with cationic potato starch in an amount equal to that used in emulsion A.

The paper stock consisted of 50% softwood/50% hardwood bleached kraft refined to 500 Canadian standard freeness with 15% added precipitated calcium carbonate filler based on the fiber. The pH was adjusted to 7.5 and the consistency to 0.6%. Batches containing 10 g of dry fiber were treated while stirring with a given amount of ASA sizing emulsion, followed by a solution of cationic retention aid equal to one pound/ton dosage. Three 2.8 g handsheets, each 8 inches square, were formed from each batch using a Noble and Wood handsheet former. The formed sheets were pressed between felts in the nip of press rolls, then drum dried on a rotary drier for one minute at 240° F. The sheets were conditioned at 73° F. and 50% relative humidity before measuring the sizing using an ink penetration test similar in design to that described in Tappi Standard 530 pm-83 using 1.25% aqueous naphthol green B dye buffered to pH 7 as the test fluid. Four measurements were made on each of the three sheets and the test results averaged. The results shown in Table 11 demonstrate the amounts of ASA, emulsified at low shear using quaternary amines, that are effective for sizing paper.

TABLE 11

| Example No. | Sizing Emulsion | ASA Dosage, lb/ton | Ink Penetration, seconds |
|---|---|---|---|
| 106C | A | 2 | 95 |
| 107 | B | 2 | 104 |
| 108C | A | 2.5 | 259 |
| 109 | B | 2.5 | 224 |

TABLE 11-continued

| Example No. | Sizing Emulsion | ASA Dosage, lb/ton | Ink Penetration, seconds |
|---|---|---|---|
| 110C | A | 3 | 428 |
| 111 | B | 3 | 342 |
| 112C | A | 3.5 | 657 |
| 113 | B | 3.5 | 525 |

EXAMPLES 114–123

The diethyl sulfate quaternary of soya dimethyl amine was dissolved in ASA at levels of 1 to 10% by weight in one percent increments. Sizing emulsions were prepared from these samples using the low shear emulsification procedure of Examples 1–12. The Klett turbidity values of the resulting sizing emulsions are shown in Table 12, demonstrating the amounts of quaternary amine effective for producing ASA emulsions of various droplet sizes.

TABLE 12

| Example No. | Wt. % of Diethyl Sulfate Quaternary of Soya Dimethyl Amine in ASA | Klett Turbidity |
|---|---|---|
| 114 | 1 | 6 |
| 115 | 2 | 160 |
| 116 | 3 | 164 |
| 117 | 4 | 205 |
| 118 | 5 | 203 |
| 119 | 6 | 196 |
| 120 | 7 | 188 |
| 121 | 8 | 185 |
| 122 | 9 | 178 |
| 123 | 10 | 186 |

EXAMPLES 124–128

A series of 5 sizing emulsions were prepared by the low shear emulsification of Examples 1–12, except that the amount of ASA, which contained 5% by weight of the diethyl sulfate quaternary of soya dimethyl amine, was varied as shown in Table 13, in emulsions having various pH values (the pH of the tap water was not otherwise The results in Table 13 show the effect of changing ASA concentration, pH and quaternary amine concentration at constant ASA/quaternary amine.

TABLE 13

| Example No. | ASA Concentration, Wt. % | pH of Emulsion | Klett Turbidity |
|---|---|---|---|
| 124 | 0.55 | 5.6 | 187 |
| 125 | 1.08 | 4.4 | 198 |
| 126 | 2.11 | 3.2 | 214 |
| 127 | 3.41 | 3.2 | 216 |
| 128 | 5.79 | 3.2 | 195 |

EXAMPLES 129–136

A series of 8 sizing emulsions were prepared by the low shear procedure of Examples 1–12, using deionized water adjusted to pH 3 with 0.1N hydrochloric acid and having various amounts of sulfate ion as shown in Table 14. The ASA contained 5% by weight of the diethyl sulfate quaternary of soya dimethyl amine. The effect of sulfate concentration on droplet size is shown in Table 14.

TABLE 14

| Example No. | Sulfate ion concentration, ppm | Klett Turbidity |
| --- | --- | --- |
| 129 | 0 | 123 |
| 130 | 5 | 182 |
| 131 | 10 | 200 |
| 132 | 20 | 220 |
| 133 | 40 | 232 |
| 134 | 80 | 242 |
| 135 | 160 | 262 |
| 136 | 320 | 236 |

EXAMPLES 137–142

A sample of ASA containing 5% by weight of the diethyl sulfate quaternary of soya dimethyl amine was stored in an oven at 40° C. The water content of the sample was measured by Karl Fisher analysis to be 0.012% by weight. Periodically an aliquot was withdrawn and used to prepare an emulsion using the low shear emulsification procedure of Examples 1–12. The Klett turbidity values of the resulting sizing emulsions were measured as shown in Table 15, demonstrating the stability of the ASA/amine mixture.

TABLE 15

| Example No. | Storage time at 40° C., days | Klett turbidity |
| --- | --- | --- |
| 137 | 1 | 220 |
| 138 | 7 | 240 |
| 139 | 20 | 222 |
| 140 | 28 | 224 |
| 141 | 40 | 215 |
| 142 | 99 | 218 |

EXAMPLE 143

Into a 5-gallon pail was added 7500 mL of deionized water cooled to 13° C. The sulfate ion concentration was adjusted to 50 ppm by adding 37.5 mL of a 1% sodium sulfate solution. The pH was adjusted to 3 by adding 25 mL of 0.5N hydrochloric acid. While stirring at low shear with a small propeller-type mixer, 75.8 g of ASA containing 5% by weight of the diethyl sulfate quaternary of soya dimethyl amine was added. Mixing was continued for about 30 seconds, then stopped. The Klett turbidity of the resulting emulsion was 244. The ASA emulsion was stabilized by adding 7.5 liters of a 3% cationic potato starch solution. The Klett turbidity of the emulsion following the addition of the starch was 248. This Example demonstrates that, on this scale, low shear mixing with a small propeller-type mixer may be used to prepare a sizing emulsion, and also the effect of post-adding starch on the droplet size of the emulsion.

EXAMPLE 144

Ten inches of a ¼ inch plastic disposable-type static mixer (obtained commercially from Cole-Palmer, Inc.) was inserted into a section of ¼ inch ID plastic tubing. The static mixer contained 24 elements per 6 inches of length. While tap water was being pumped through the static mixer at about 1 liter/minute at a pressure drop of about 26 psig, ASA containing 5% by weight of the diethyl sulfate quaternary of soya dimethyl amine was metered into the plastic tubing just before the static mixer at a rate of about 20 mL per minute. The resulting emulsion had a Klett turbidity of >218. After stabilizing the emulsion by mixing 1:1 with a 3% cationic potato starch solution, the droplet size was also measured using a Horiba CAPA 700 particle size analyzer, giving a volume median droplet size of 0.89 micron. The Example demonstrates the use of another mode of low shear mixing that may be utilized to prepare sizing emulsions with quaternary amines.

EXAMPLES 145–171

Sizing emulsions were prepared having various amounts of various salts by the same general procedure used for Examples 37–47, except that the deionized water used to prepare each emulsion was adjusted to pH 3.0 using 0.1N hydrochloric acid. The Klett turbidity of the resulting emulsions are shown in Table 16. These results show the amounts and types of salts effective to produce sizing emulsions having various droplet sizes.

TABLE 16

| Example No. | Salt | Salt Concentration, ppm of Anion | Klett Turbidity |
| --- | --- | --- | --- |
| 145 | NaCl | 5 | 126 |
| 146 | NaCl | 10 | 124 |
| 147 | NaCl | 20 | 137 |
| 148 | NaCl | 40 | 151 |
| 149 | NaCl | 80 | 151 |
| 150 | NaCl | 160 | 155 |
| 151 | NaCl | 320 | 180 |
| 152 | NaCl | 640 | 184 |
| 153 | NaCl | 1280 | 196 |
| 154 | NaCl | 2560 | 196 |
| 155 | $Na_3PO_4$ | 5 | 120 |
| 156 | $Na_3PO_4$ | 10 | 125 |
| 157 | $Na_3PO_4$ | 20 | 126 |
| 158 | $Na_3PO_4$ | 40 | 128 |
| 159 | $Na_3PO_4$ | 80 | 135 |
| 160 | $Na_3PO_4$ | 160 | 141 |
| 161 | $Na_3PO_4$ | 320 | 156 |
| 162 | $Na_3PO_4$ | 640 | 170 |
| 163 | $Na_3PO_4$ | 1280 | 184 |
| 164 | $Na_3PO_4$ | 2560 | 196 |
| 165 | $CaCl_2$ | 5 | 133 |
| 166 | $CaCl_2$ | 10 | 122 |
| 167 | $CaCl_2$ | 20 | 126 |
| 168 | $CaCl_2$ | 40 | 138 |
| 169 | $CaCl_2$ | 80 | 151 |
| 170 | $CaCl_2$ | 160 | 165 |
| 171 | $CaCl_2$ | 320 | 175 |

EXAMPLES 172–179

The low shear emulsification procedure of Examples 1–12 was performed at various temperatures using ASA containing 5% by weight of the diethyl sulfate quaternary of soya dimethyl amine, except that deionized water at pH 3 at sulfate levels of 25 ppm and 100 ppm was used to prepare the sizing emulsions. The Klett turbidity values of the resulting ASA emulsions are shown in Table 17. These results demonstrate emulsification temperatures and sulfate levels effective for producing sizing emulsions having various droplet sizes.

TABLE 17

| Example No. | Emulsification Temperature, °C. | Sulfate Concentration, ppm | Klett Turbidity |
| --- | --- | --- | --- |
| 172 | 13 | 25 | 249 |
| 173 | 13 | 100 | 234 |
| 174 | 20 | 25 | 241 |
| 175 | 20 | 100 | 222 |
| 176 | 30 | 25 | 232 |

TABLE 17-continued

| Example No. | Emulsification Temperature, °C. | Sulfate Concentration, ppm | Klett Turbidity |
|---|---|---|---|
| 177 | 30 | 100 | 213 |
| 178 | 40 | 25 | 201 |
| 179 | 40 | 100 | 190 |

EXAMPLES 180–195

ASA containing 5% by weight of the diethyl sulfate quaternary of soya dimethyl amine was emulsified by the general procedure of Examples 94–105 except that tap water adjusted to pH 3 was used and the water contained varying levels of pregelatinized cationic potato starch (expressed as wt. % on total). Table 18 shows the Klett turbidity values of the resulting sizing emulsions. These examples demonstrate the effect of emulsification shear rate and cationic polymer concentration on sizing emulsion droplet size.

TABLE 18

| Example No. | Wt % cationic potato starch | Speed Setting, rpm | Mixing Time, seconds | Klett Turbidity |
|---|---|---|---|---|
| 180 | 0 | 4,000 | 5 | 234 |
| 181 | 0 | 7,000 | 30 | 254 |
| 182 | 0 | 10,000 | 60 | 272 |
| 183 | 0 | 10,000 | 120 | 272 |
| 184 | 1 | 4,000 | 5 | 145 |
| 185 | 1 | 7,000 | 30 | 170 |
| 186 | 1 | 10,000 | 60 | 218 |
| 187 | 1 | 10,000 | 120 | 222 |
| 188 | 2 | 4,000 | 5 | 144 |
| 189 | 2 | 7,000 | 30 | 163 |
| 190 | 2 | 10,000 | 60 | 189 |
| 191 | 2 | 10,000 | 120 | 193 |
| 192 | 3 | 4,000 | 5 | 130 |
| 193 | 3 | 7,000 | 30 | 152 |
| 194 | 3 | 10,000 | 60 | 175 |
| 195 | 3 | 10,000 | 120 | 180 |

We claim:

1. A composition comprised of
   (a) alkenyl succinic anhydride, and
   (b) about 3% to about 20%, by weight based on said alkenyl succinic anhydride, of an amine selected from the group consisting of trialkyl amine of the formula (I), dimethyl sulfate quaternary salt of trialkyl amine of the formula (I), benzyl chloride quaternary salt of trialkyl amine of the formula (I), and diethyl sulfate quaternary salt of trialkyl amine of the formula (I),

wherein $R_1$ is methyl or ethyl, $R_2$ is methyl or ethyl, and $R_3$ is alkyl having 14 to 24 carbon atoms, and wherein said composition contains about 0.1% water or less.

2. A composition as claimed in claim 1 wherein said $R_3$ is alkyl having from 16 to 18 carbon atoms.

3. A composition as claimed in claim 1 which is comprised of from about 4% to about 10% of said amine, by weight based on said alkenyl succinic anhydride.

4. A composition consisting essentially of
   (a) alkenyl succinic anhydride, and
   (b) about 3% to about 20%, by weight based on said alkenyl succinic anhydride, of an amine selected from the group consisting of trialkyl amine of the formula (I), dimethyl sulfate quaternary salt of trialkyl amine of the formula (I), benzyl chloride quaternary salt of trialkyl amine of the formula (I), and diethyl sulfate quaternary salt of trialkyl amine of the formula (I),

wherein $R_1$ is methyl or ethyl, $R_2$ is methyl or ethyl, and $R_3$ is alkyl having 14 to 24 carbon atoms.

5. A composition comprised of
   (a) alkenyl succinic anhydride,
   (b) about 3% to about 20%, by weight based on said alkenyl succinic anhydride, of an amine selected from the group consisting of trialkyl amine of the formula (I), dimethyl sulfate quaternary salt of trialkyl amine of the formula (I), benzyl chloride quaternary salt of trialkyl amine of the formula (I), and diethyl sulfate quaternary salt of trialkyl amine of the formula (I),

wherein $R_1$ is methyl or ethyl, $R_2$ is methyl or ethyl, and $R_3$ is alkyl having 14 to 24 carbon atoms,
   (c) water, and
   (d) an inorganic salt,
      wherein said alkenyl succinic anhydride is dispersed in said water to form an emulsion,
      wherein said inorganic salt is present in an amount effective to reduce the droplet size of said emulsion, and
      wherein said emulsion has a pH value effective to provide an emulsion average droplet size of about 3 microns or less.

6. A composition as claimed in claim 5 wherein said $R_3$ is alkyl having from 16 to 18 carbon atoms.

7. A composition as claimed in claim 5 which is comprised of from about 4% to about 10% of said amine, by weight based on said alkenyl succinic anhydride.

8. A composition as claimed in claim 5 which further comprises an emulsion-stabilizing amount of a cationic polymer.

9. A composition as claimed in claim 5 which further comprises an emulsion-stabilizing amount of a cationic starch.

10. A composition as claimed in claim 5 wherein said emulsion has a pH value of about 4.5 or lower.

11. A composition comprised of
   (a) alkenyl succinic anhydride,
   (b) about 4% to about 10%, by weight based on said alkenyl succinic anhydride, of an amine selected from the group consisting of dimethyl sulfate quaternary salt of trialkyl amine of the formula (I) and diethyl sulfate quaternary salt of trialkyl amine of the formula (I),

wherein $R_1$ is methyl or ethyl, $R_2$ is methyl or ethyl, and $R_3$ is alkyl having 16 to 18 carbon atoms, (c) water, and (d) a sulfate salt, wherein said alkenyl succinic anhydride is dispersed in said water to form an emulsion, wherein said sulfate salt is present in an amount effective to reduce the droplet size of said emulsion, and wherein said emulsion has a pH value of about 4.0 or lower.

12. A process comprising mixing (a) alkenyl succinic anhydride, (b) about 3% to about 20%, by weight based on said alkenyl succinic anhydride, of an amine selected from the group consisting of trialkyl amine of the formula (I), dimethyl sulfate quaternary salt of trialkyl amine of the formula (I), benzyl chloride quaternary salt of trialkyl amine of the formula (I), and diethyl sulfate quaternary salt of trialkyl amine of the formula (I),

wherein $R_1$ is methyl or ethyl, $R_2$ is methyl or ethyl, and $R_3$ is alkyl having 14 to 24 carbon atoms, (c) water, and (d) an inorganic salt, to form an emulsion, wherein said inorganic salt is present in an amount effective to reduce the droplet size of said emulsion, and wherein said emulsion has a pH value effective to provide an emulsion average droplet size of about 3 microns or less.

13. A process as claimed in claim 12 which further comprises mixing in an emulsion-stabilizing amount of a cationic polymer.

14. A process as claimed in claim 12 which further comprises mixing in an emulsion-stabilizing amount of a cationic starch.

15. A process as claimed in claim 12 wherein said mixing is carried out at low shear.

16. A process as claimed in claim 12 wherein said $R_3$ is alkyl having from 16 to 18 carbon atoms.

17. A process as claimed in claim 12 which comprises mixing from about 4% to about 10% of said amine, by weight based on said alkenyl succinic anhydride.

18. A process comprising mixing (a) a composition comprised of (i) alkenyl succinic anhydride, and (ii) about 3% to about 20%, by weight based on said alkenyl succinic anhydride, of an amine selected from the group consisting of trialkyl amine of the formula (I), dimethyl sulfate quaternary salt of trialkyl amine of the formula (I), benzyl chloride quaternary salt of trialkyl amine of the formula (I), and diethyl sulfate quaternary salt of trialkyl amine of the formula (I),

wherein $R_1$ is methyl or ethyl, $R_2$ is methyl or ethyl, and $R_3$ is alkyl having 14 to 24 carbon atoms;

(b) water; and (c) an inorganic salt to form an emulsion, wherein said inorganic salt is present in an amount effective to reduce the droplet size of said emulsion, and wherein said emulsion has a pH value effective to provide an emulsion average droplet size of about 3 microns or less.

19. A process as claimed in claim 18 wherein said mixing is carried out at low shear.

20. A process comprising mixing (a) alkenyl succinic anhydride, (b) about 4% to about 10%, by weight based on said alkenyl succinic anhydride, of an amine selected from the group consisting of dimethyl sulfate quaternary salt of trialkyl amine of the formula (I) and diethyl sulfate quaternary salt of trialkyl amine of the formula (I),

wherein $R_1$ is methyl or ethyl, $R_2$ is methyl or ethyl, and $R_3$ is alkyl having 16 to 18 carbon atoms, (c) water, and (d) a sulfate salt, to form an emulsion, wherein said sulfate salt is present in an amount effective to reduce the droplet size of said emulsion, wherein said emulsion has a pH value of about 4.5 or lower, and wherein said mixing is carried out at low shear.

21. A method comprising (a) providing paper stock;

(b) providing a composition comprised of (i) alkenyl succinic anhydride, (ii) about 3% to about 20%, by weight based on said alkenyl succinic anhydride, of an amine selected from the group consisting of trialkyl amine of the formula (I), dimethyl sulfate quaternary salt of trialkyl amine of the formula (I), benzyl chloride quaternary salt of trialkyl amine of the formula (I), and diethyl sulfate quaternary salt of trialkyl amine of the formula (I),

wherein $R_1$ is methyl or ethyl, $R_2$ is methyl or ethyl, and $R_3$ is alkyl having 14 to 24 carbon atoms, (iii) water, and (iv) an inorganic salt, wherein said alkenyl succinic anhydride is dispersed in said water to form an emulsion, wherein said inorganic salt is present in an amount effective to reduce the droplet size of said emulsion, and wherein said emulsion has a pH value effective to provide an emulsion average droplet size of about 3 microns or less;

(c) forming a web from said paper stock; and (d) mixing said emulsion with said paper stock or applying said emulsion to said web, in an amount effective to size paper that is formed from said web.

22. A method as claimed in claim 21 wherein said composition is formed by mixing said (i), (ii), (iii), and (iv) at low shear.

23. A method as claimed in claim 21 wherein said $R_3$ is alkyl having from 16 to 18 carbon atoms.

24. A method as claimed in claim 21 wherein said composition is comprised of from about 4% to about 10% of said amine, by weight based on said alkenyl succinic anhydride.

25. A method comprising (a) providing paper stock;

(b) providing a composition comprised of
  (i) alkenyl succinic anhydride,
  (ii) about 4% to about 10%, by weight based on said alkenyl succinic anhydride, of an amine selected from the group consisting of trialkyl amine of the formula (I), dimethyl sulfate quaternary salt of trialkyl amine of the formula (I), benzyl chloride quaternary salt of trialkyl amine of the formula (I), and diethyl sulfate quaternary salt of trialkyl amine of the formula (I),

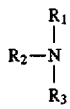
(I)

wherein $R_1$ is methyl or ethyl, $R_2$ is methyl or ethyl, and $R_3$ is alkyl having 16 to 18 carbon atoms, (iii) water, and (iv) an inorganic salt, wherein said alkenyl succinic anhydride is dispersed in said water to form an emulsion, wherein said composition is formed by mixing said (i), (ii), (iii), and (iv) at low shear, wherein said inorganic salt is present in an amount effective to reduce the droplet size of said emulsion, and wherein said emulsion has a pH value of about 4.5 or lower;

(c) forming a web from said paper stock; and (d) applying said emulsion to said web, in an amount effective to size paper that is formed from said web, by a method selected from the group consisting of spraying and size pressing.

* * * * *